US011422680B1

(12) United States Patent
Mahapatra et al.

(10) Patent No.: US 11,422,680 B1
(45) Date of Patent: Aug. 23, 2022

(54) WORKFLOW EXECUTION FRAMEWORK

(71) Applicant: VCE Company, LLC, Richardson, TX (US)

(72) Inventors: Akshaya Mahapatra, Richardson, TX (US); Vandana Rao, Richardson, TX (US); Nilay Chheda, Richardson, TX (US); Richard Kirchhofer, Richardson, TX (US); Michael Tan, Richardson, TX (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 780 days.

(21) Appl. No.: 14/285,525

(22) Filed: May 22, 2014

(51) Int. Cl.
*G06F 3/0484* (2022.01)
*G06F 9/455* (2018.01)

(52) U.S. Cl.
CPC ........ *G06F 3/0484* (2013.01); *G06F 9/45533* (2013.01)

(58) Field of Classification Search
CPC ............................ G06F 3/0484; G06F 9/45533
See application file for complete search history.

(56) References Cited

U.S. PATENT DOCUMENTS

| | | | | |
|---|---|---|---|---|
| 8,788,407 B1 * | 7/2014 | Singh | ................ | G06F 17/30412 705/35 |
| 2006/0004749 A1 * | 1/2006 | Dettinger | ............... | G06Q 10/06 |
| 2006/0224432 A1 * | 10/2006 | Li | ........................... | G06Q 10/06 705/7.21 |
| 2007/0174101 A1 * | 7/2007 | Li | .................... | G06Q 10/06315 705/7.26 |
| 2008/0256172 A1 * | 10/2008 | Hebert | ................... | G06Q 10/06 709/202 |
| 2009/0006997 A1 * | 1/2009 | Jiang | ...................... | G06Q 10/00 715/771 |
| 2009/0059909 A1 * | 3/2009 | Sullivan | ................. | G06Q 10/06 370/360 |
| 2009/0271372 A1 * | 10/2009 | Fife | .................... | G06F 17/30427 |
| 2009/0287528 A1 * | 11/2009 | Strickland | .......... | G06Q 10/0633 705/7.27 |
| 2011/0107294 A1 * | 5/2011 | Ionfrida | ................... | H04L 47/70 717/101 |
| 2012/0137309 A1 * | 5/2012 | Makam | .................. | G06Q 10/10 719/320 |
| 2012/0278513 A1 * | 11/2012 | Prevost | ................... | H04L 67/32 710/39 |
| 2013/0111483 A1 * | 5/2013 | Milic-Frayling | ...... | G06Q 10/10 718/102 |

(Continued)

*Primary Examiner* — Jeanette J Parker
(74) *Attorney, Agent, or Firm* — Womble Bond Dickinson (US) LLP (57) ABSTRACT

A method for executing workflows is provided. The method includes querying a workflow engine regarding an input parameter of a workflow, responsive to a selection from a portal to execute the workflow. The method includes generating a graphical user interface requesting a value of the input parameter and transmitting the graphical user interface to the portal for display. The method includes sending a workflow invocation request, with the value of the input parameter from the graphical user interface, to the workflow engine, wherein at least one method operation is performed by a processor. In some embodiments, a workflow execution framework is provided.

17 Claims, 5 Drawing Sheets

(56) References Cited

U.S. PATENT DOCUMENTS

2013/0283141 A1* 10/2013 Stevenson .............. G06Q 10/10
715/222
2014/0229898 A1* 8/2014 Terwedo ............. G06F 3/04817
715/835

* cited by examiner

WORKFLOW EXECUTION FRAMEWORK

BACKGROUND

Workflows are becoming popular for infrastructure management. Many computer tasks can be automated with the use of workflows, which are graphical presentations of sequences of steps. Workflows are more manageable than a group of scripts, and easier to understand and modify. A workflow may be developed with the use of a workflow tool, on a computer system. Workflows can be selected and requested for execution from a portal, which is an online service and/or a resource access and management point. Typically, the workflow does the backend work, and the front end is a user interface (UI) that is written specific to the portal, such as vCloud Automation Center or Cisco Intelligent Automation Center. Generally, workflows provide only basic user interface capabilities. Most of the user interface is provided by the portals, which pass the required user inputs to the workflows. There is much duplication of effort in the current scheme, and the interfaces change from one portal to the next. If a workflow needs to interface to multiple portals, each portal provides a mechanism to display the user interface for the workflow and invoke the workflow with necessary parameters. Each portal develops an input validation, provides logging capabilities and each portal develops logic to process return status and retry capabilities. With all these differing interfaces, there is a lack of standardization across the portals.

SUMMARY

In some embodiments, a method for executing workflows is provided. The method includes querying a workflow engine regarding an input parameter of a workflow, responsive to a selection from a portal to execute the workflow. The method includes generating a graphical user interface requesting a value of the input parameter and transmitting the graphical user interface to the portal for display. The method includes sending a workflow invocation request, with the value of the input parameter from the graphical user interface, to the workflow engine, wherein at least one method operation is performed by a processor. In some embodiments the method operations may be embodied as instructions on a computer readable medium. In other embodiments a workflow execution framework is provided.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A workflow execution framework, disclosed herein, provides a mechanism for workflow execution that can be shared by multiple portals. In addition, the workflow execution framework provides a mechanism for generating a user interface for a workflow. The user interface requests user input for values of input parameters to the workflow, which are then passed to the workflow. The user interface is readily embedded in portals. The workflow execution framework includes a validation framework that is shared across the portals.

Figure 1:
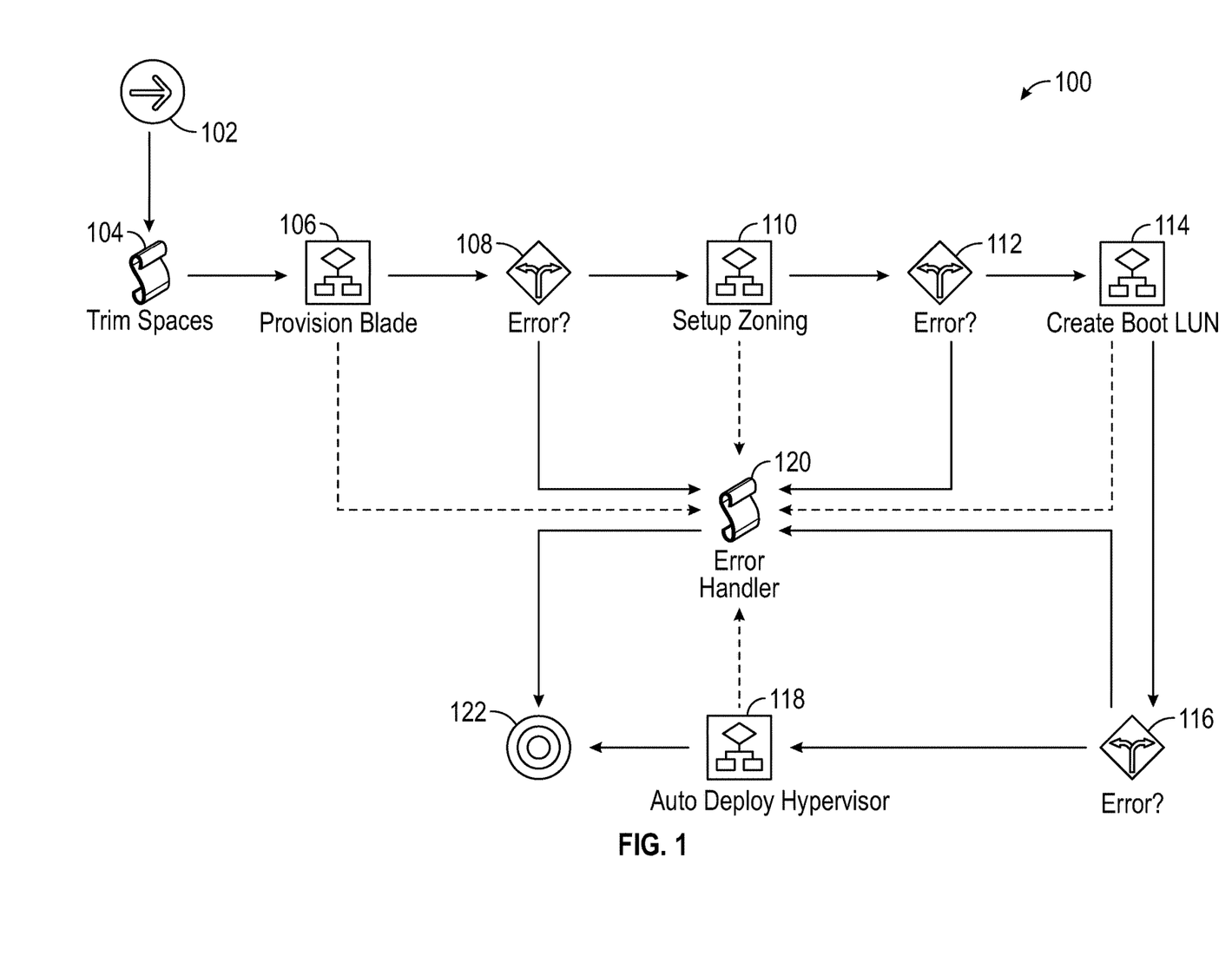
FIG. 1 is an example of a workflow in accordance with some embodiments.

FIG. 1 is an example of a workflow. It should be appreciated that workflows are becoming increasingly popular relative to scripting, as a method of infrastructure management. This is primarily because workflows are easier to maintain, easier to understand, and provide a visual flow to non-technical users. A user can develop a workflow using a workflow design tool, such as available in the VMWARE™ vCenter Orchestrator. To develop a workflow, the user drags and drops various symbols and connects the symbols with arrows in some embodiments. Generally, a workflow embodies a service fulfillment process. One example would be a workflow that adds a new tenant and provisions resources for that tenant. Another example would be a workflow that instantiates and deploys a virtual application. Yet another example would be a workflow that removes a tenant. Further examples include commissioning a virtual local area network, provisioning a virtual machine, decommissioning a virtual machine, among others.

The example shown in FIG. 1 illustrates a schema of a workflow 100 that adds a host to a virtual center. The visual display of the workflow 100 includes symbols for start 102, trim spaces 104, provision blade 106, error 108, setup zoning 110, error 112, create boot LUN (logical unit number) 114, error 116, auto deploy hypervisor 118, error handler 120, and end target 122. In some embodiments the workflows are generated by dragging and dropping workflow elements, such as symbols 102-122. The workflow elements are accessed from a library of workflows in some embodiments. It should be appreciated that many types of workflows are possible, with various symbols and that FIG. 1 is one example not meant to be limiting. In addition, the workflow elements may be customized by a user through plug-ins or customizable building blocks.

Figure 2A:
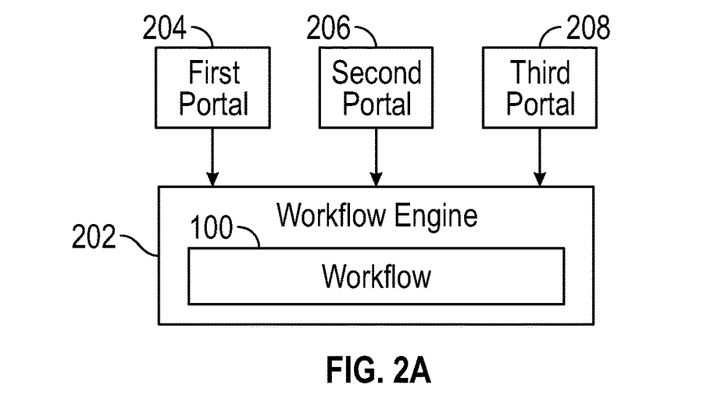
FIG. 2A is a block diagram showing a portal invoking a workflow to execute on a workflow engine in accordance with some embodiments.

FIG. 2A is a block diagram showing a portal 204 invoking a workflow 100 to execute on a workflow engine 202 in accordance with some embodiments. A first portal 204, a second portal 206, and a third portal 208 are coupled to the workflow engine 202, for example by a network. Without a workflow execution framework, as will be further described with reference to FIG. 2B, the portals 204, 206, 208 each provide a user interface for the workflow, invoke the workflow with necessary parameters, and provide input validation, logic to process return status and retry, and logging capabilities. The solution presented in FIG. 2B provides a standardized framework in order to more efficiently accommodate workflows across different portals.

Figure 2B:
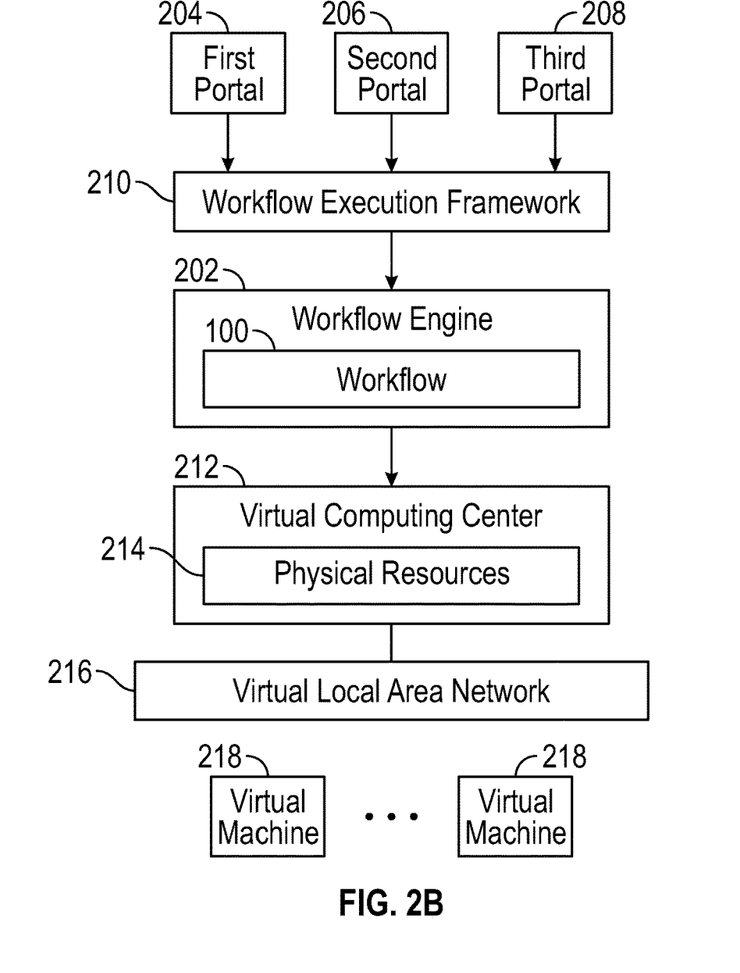
FIG. 2B is a block diagram showing a workflow execution framework cooperating with a portal and a workflow engine to invoke a workflow, in accordance with some embodiments.

FIG. 2B is a block diagram showing a workflow execution framework 210 cooperating with a portal 204 and a workflow engine 202 to invoke a workflow 100, in accordance with an embodiment of the present disclosure. The workflow execution framework 210 can be implemented as a layer of software that handles workflow execution requests. Physically, the workflow execution framework 210 can be implemented in a computer coupled to a virtual computing center 212, or can be included in the physical resources 214 of a virtual computing center 212, for example as software executing on a processor thereof. The workflow 100 could commission, provision or decommission one or more virtual machines 218, a virtual local area network (VLAN) 216, or other virtual or physical arrangement of the physical resources 214 available from the virtual computing center 212, as a service fulfillment process, for example. In one embodiment, the workflow execution framework 210 and the workflow engine 202 are implemented on the same server, which could be a physical computing resource or a virtual server implemented on physical computing resources. In various embodiments, the workflow execution framework 210 and the workflow engine 202 are implemented in various physical computing resources.

Still referring to FIG. 2B, the workflow execution framework 210 intercepts an execution request from one of the portals 204, 206, 208 for a workflow 100, and performs various actions, as will be further described below with reference to FIG. 3. The workflow execution framework 210 generates a user interface for workflow inputs. This user interface can be in the form of HTML (hypertext markup language), or can be in the form of a portlet supported by the portals 204, 206, 208. The workflow execution framework 210 accepts user inputs, validates the user inputs, and forwards the request to the workflow 100 resident in workflow engine 202. Workflow engine 202 may be a virtual or physical computing device, e.g., a virtual server or a physical server, etc. Workflow 100 executes within work flow engine 202 and allocates physical resources 214 in virtual computing center 212. This execution allocates one or more virtual machines 218 and virtual local area network 216, in some embodiments. The workflow execution framework 210 processes response of the workflow 100, and determines whether to send the response to the portal 204 which initiated the workflow 100, or to retry or restart the workflow 100. Since the workflow execution framework 210 is a common interface for all workflow execution requests, functionality such as logging, tracing and exception handling can be handled centrally by the workflow execution framework 210, rather than having these functions handled by each of the portals 204, 206, 208 as in FIG. 2A.

Figure 3:
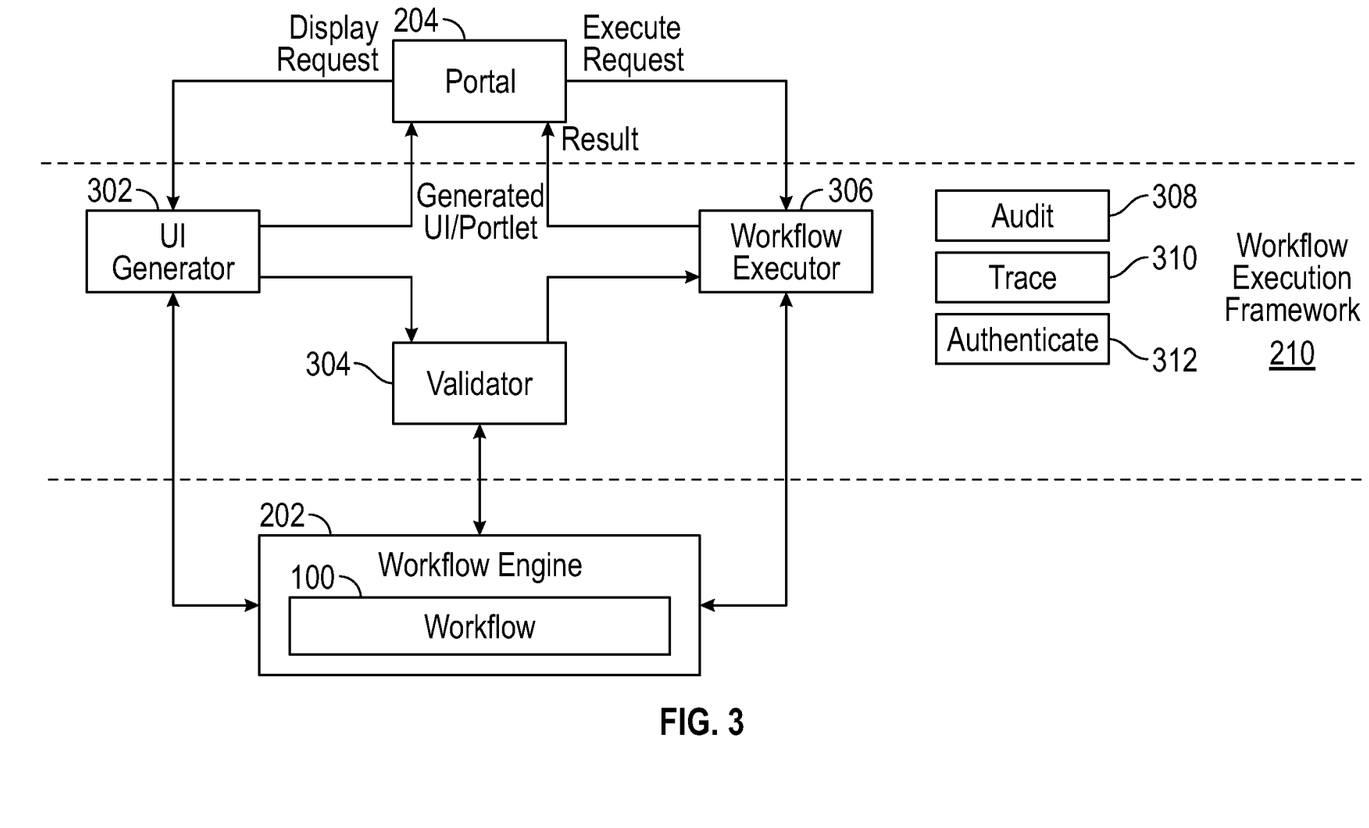
FIG. 3 is a block diagram showing details of an embodiment of the workflow execution framework of FIG. 2B in accordance with some embodiments.

FIG. 3 is a block diagram showing details of an embodiment of the workflow execution framework 210 of FIG. 2B in accordance with some embodiments. The workflow execution framework 210 includes a user interface generator 302, a validator 304, and a workflow executor 306, which sit between and communicate with the portal 204 and the workflow engine 202. The user interface generator 302 queries the workflow engine 202, which could be a vCenter ORCHESTRATOR™ or another platform that provides a library of extensible workflows, to determine all of the inputs needed by the workflow 100. Output of the user interface generator 302 could be in HTML or JavaScript, or another format that can be displayed on a browser of a container of a portal 204. The validator 304, which could be in the form of a validation framework, is implemented as a library of functions that validate user input using underlying infrastructure information in some embodiments. For example, if a VLAN identifier (ID) is entered as a value of a parameter for the name of a new VLAN, then the validator 304 would query the network switches and hosts to find out if this is an existing VLAN. If the validator 304 determines that the VLAN exists, the validator 304 sets a flag or sends a message indicating that the VLAN ID corresponds to an existing VLAN. The workflow executor 306 sends an execute command to the workflow engine after all inputs are validated.

Still referring to FIG. 3, some embodiments of the workflow execution framework 210 include an audit module 308, a trace module 310, and/or an authenticate module 312 in various combinations. The audit module 308 audits workflows 100. The trace module 310 traces workflows 100. The authenticate module 312 authenticates users of the portals 204, 206, 208. Each of these modules, where present in embodiments, cooperates with the user interface generator 302 in various ways specific to the module. For example, the audit module 308 can initiate an audit, as selected by a user interface presented to the portal 204. The trace module 310 can initiate a trace of a workflow, as selected by a user interface presented to the portal 204. The authenticate module 312 obtains values of input parameters from the user interface, such as a user ID, and authenticate such.

An execution flow example is described below for illustrative purposes. A user selects a workflow 100 to execute from the portal 204. The portal 204 sends a request (shown in FIG. 3 as DISPLAY REQUEST) to the user interface generator 302, to generate a user interface, for example using HTML. The user interface generator 302 responds with the generated user interface or portlet (shown as GENERATED UI/PORTLET), which is sent to the portal 204. The portal 204 displays the user interface. The user enters inputs and submits the request, from the portal 204 to the workflow executor 306 (shown as EXECUTE REQUEST). In various embodiments, the request travels from the portal 204 to the workflow executor 306 directly, or via the user interface generator 302. The validator 304 obtains the user inputs from the graphical user interface, for example via the user interface generator 302, and validates the inputs. If the validation fails, errors are displayed on the portal 204. For example, the validator 304 or the user interface generator 302, could send to the portal 204 a user interface with errors displayed thereupon. If the validation succeeds, the validator 304 so informs the workflow executor 306 and passes the validated values of the user inputs to the workflow executor 306. The workflow executor 306 sends the workflow invocation request to the workflow engine 202. Response from the workflow 100, shown as RESULT, is returned to the portal 204, for example by the workflow executor 306. The workflow executor 306 determines, from the response of the workflow 100, whether to retry the workflow.

In order to integrate the user interface at the portal 204, the URL (Universal Resource Locator) of the user interface is introduced into a browser at the portal 204 of FIG. 3. This could be accomplished in one of the containers of a webpage at the portal 204, by associating the URL with the container, so that the URL points to the user interface and therefore to the workflow 100. The user interface is thus agnostic of the portal 204 and portable across portals 204, 206, 208. When a user selects a workflow 100, for example by clicking or double-clicking on an icon displayed on the user interface, the user interface generator 302 obtains the name of the workflow. The user interface generator 302 applies the name of the workflow in an appropriately formatted query to the workflow engine 202 regarding an input parameter of the workflow, which then replies with the names of input parameters needed for the workflow 100. The user interface generator 302 can then populate a user interface with the names of the input parameters, and so request values of the input parameters from the user, via the user interface presented to the portal 204.

Selection of a workflow, originally directed from the portal 204 to the workflow engine 202, can be redirected to the workflow execution framework 210. This redirection can be achieved by insertion of a redirection code at an appropriate server in the path to the workflow engine 202, for example on the same server as the workflow engine 202, in some embodiments. In this manner, the workflow execution framework 210 can be introduced without modification to the portal 204. Alternatively, the workflow execution framework 210 can be introduced with minimal modification to the portal 204, such as inclusion of the URL of the user interface.

Figure 4:
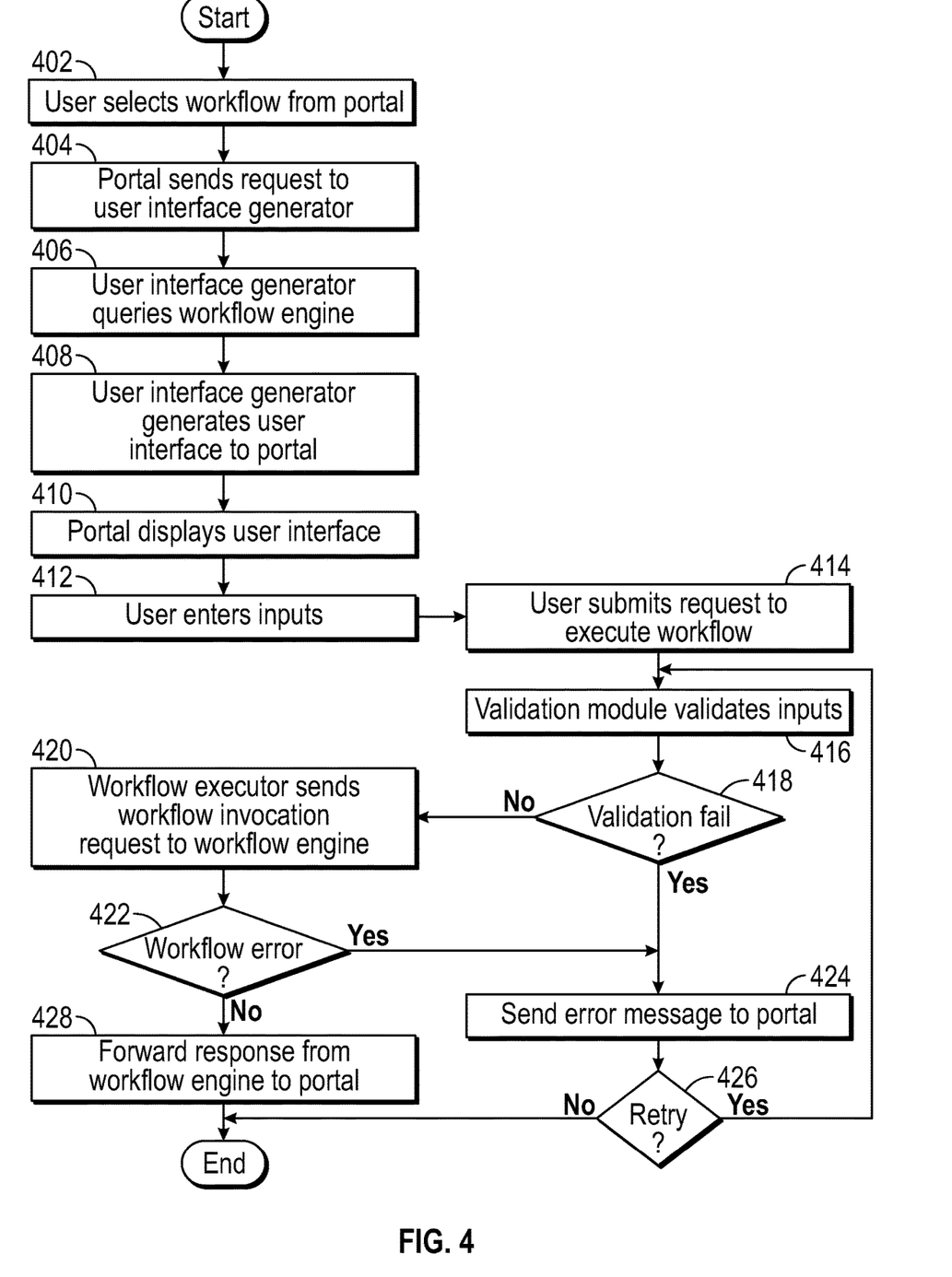
FIG. 4 is a flow diagram showing a method for executing workflows, which can be practiced on or by embodiments of the workflow execution framework.

FIG. 4 is a flow diagram showing a method for executing workflows, which can be practiced on or by embodiments of the workflow execution framework. Many or all of the steps can be executed using a processor. The method initiates with an action 402, where a user selects a workflow from a portal. For example, the user could click or double-click on an icon depicting a workflow in a container on a webpage displayed at the portal. In an action 404, the portal sends a request to the user interface generator, which could be responsive to the above mentioned click or double click in some embodiments. A redirection could be applied so that selecting the icon depicting the workflow, originally directed to the workflow engine, is redirected to the workflow execution framework.

Still referring to FIG. 4, in an action 406, the user interface generator queries the workflow engine. In some embodiments, the user interface generator obtains the name of the workflow from the request sent by the portal, and applies the name of the workflow in the query to the workflow engine, to determine inputs needed by the workflow. Particularly, the user interface generator determines, via the query, input parameters of the workflow for which a value is applicable. In an action 408, the user interface generator generates a user interface, which the user interface generator transmits to the portal. The user interface could be a graphical user interface that requests values of the input parameters, i.e., is for user input of the values of the inputs of the workflow. The user interface is arranged to receive the values of the input parameters from the portal.

In an action 410, the portal displays the user interface. The user enters inputs via a computing device, in an action 412. In so doing, the user enters values of the input parameters of the workflow. The user submits the request to execute the workflow, in an action 414. It should be appreciated that this could be accomplished by clicking an appropriate soft button on the user interface. The validation module validates inputs, in an action 416. The validation module obtains the inputs from the entries to the user interface. For example, the validation module could verify that a hostname is not presently in use, or an IP address is not presently in use. The validation module could query network switches and determine whether a VLAN ID corresponds to an existing VLAN. If there is a validation failure, in the decision action 418, flow branches to the action 424 to send an error message. If validation succeeds, i.e., if there is no validation failure, flow branches to the action 420.

In the action 420 of FIG. 4, the workflow executor sends a workflow invocation request to the workflow engine. In other words, the workflow executor initiates the workflow in the workflow engine. The workflow executor obtains the values of the input parameters from the entries to the user interface, and forwards or passes these parameter values to the workflow engine. The workflow executor sends an execute command to the workflow engine, in some embodiments, which in turn generates a response. In a decision action 422, if there is a workflow error, flow branches to the action 424, to send an error message. If there is no workflow error, flow branches to the action 428. In some embodiments, the decision action 422 is based on the response from the workflow engine, as produced in response to the action 420 or as seen in the action 428.

In the action 424 of FIG. 4, an error message is sent to the portal. This could be an error regarding a validation failure, from the action 418, or an error regarding a workflow, or an exception of the workflow, from the decision action 422. In some embodiments, there are separate error messages, and in other embodiments error messages are combined, e.g., in a status statement or report. The error message could be sent in the form of a graphical user interface with an error displayed. Flow continues to the decision action 426, to ask if there should be a retry. If there is a retry, flow branches back to the action 416, to re-validate the inputs and retry the workflow. In some embodiments, the decision as to whether or not to perform a retry is based on the response from the workflow engine, as produced in response to the action 420 or as seen in the action 428. It should be appreciated that the retry, in further embodiments, could skip the revalidation of the inputs and proceed directly to retrying the workflow, or could request new inputs. It should be further appreciated that embodiments could implement a retry counter or other mechanism to avoid getting stuck in a retry loop. If there is no retry, the flow ends, or proceeds to another entry point. In the action 428, which is arrived at if there is no workflow error, the response from the workflow engine is forwarded to the portal. It should be appreciated that the decision of whether or not to retry, in the decision action 426, could be based on the response from the workflow engine, which could include a valid response or an error indicator. After this, the flow ends, or proceeds to another entry point. In further embodiments, the workflow could be logged and/or traced. In further embodiments, user authentication could be performed.

Figure 5:
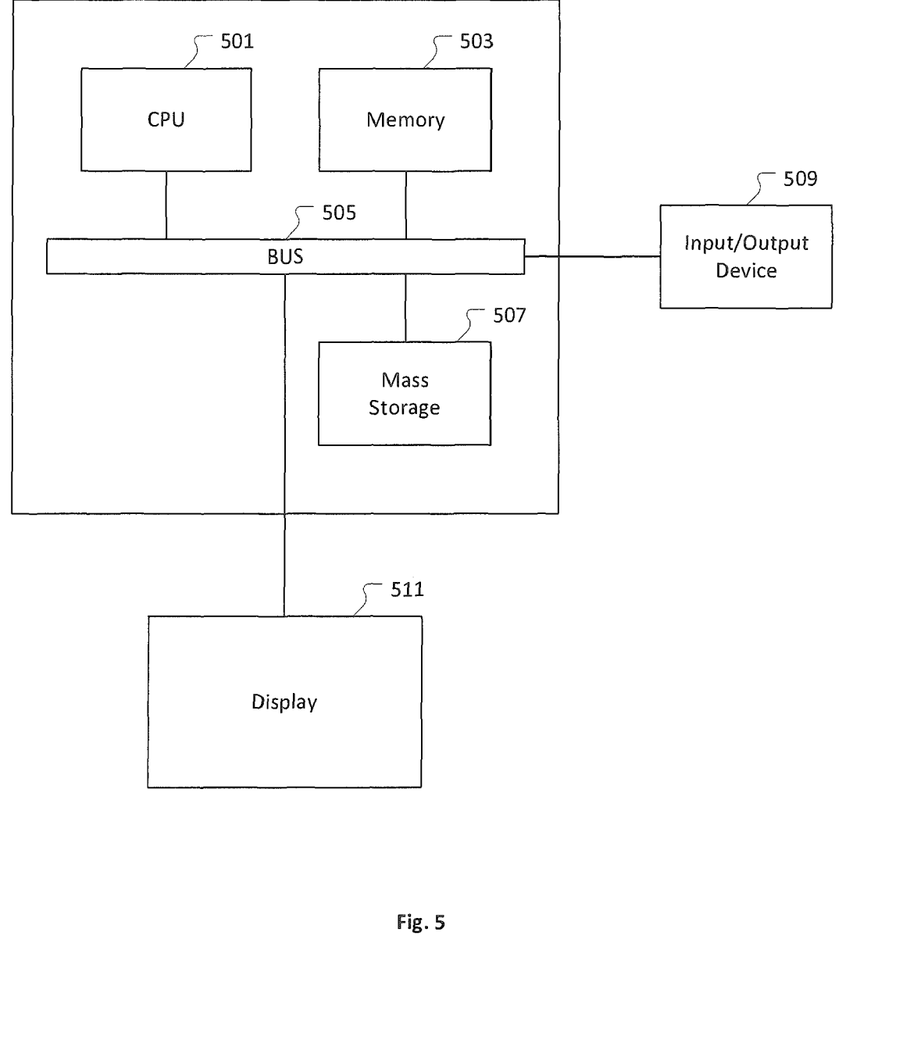
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for workflow management, interaction and operation in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for executing workflows, comprising:
receiving, a request to execute a workflow from a portal, at a computer implementing a workflow execution framework that is a common interface for workflow execution requests from a plurality of portals that includes the portal,
the workflow execution framework implemented as a software layer between the plurality of portals and a workflow engine, and by the workflow execution framework responsive to the request;
querying the workflow engine regarding an input parameter of the workflow;
generating, a graphical user interface from which a value of the input parameter is requested;
transmitting the graphical user interface to the portal for display and receipt of the value of the input parameter at the portal;
receiving the value of the input parameter from the portal, wherein the value of the input parameter is validated by the workflow execution framework; and
sending a workflow invocation request including the value of the input parameter validated by the workflow execution framework to the workflow engine, for execution of the workflow by the workflow engine.

2. The method of claim 1, further comprising:
returning a response from the workflow engine to the portal.

3. The method of claim 1, further comprising:
selecting, from the portal, the workflow to execute; and
sending a request, from the portal, to the user interface generator to generate the graphical user interface.

4. The method of claim 1, further comprising:
generating a graphical user interface with an error displayed thereupon, responsive to an invalid value of the input parameter; and
transmitting the graphical user interface with the error displayed to the portal.

5. The method of claim 1, further comprising:
auditing the workflow.

6. The method of claim 1, further comprising:
tracing the workflow.

7. A non-transitory, tangible, computer-readable media having instructions thereupon which, when executed by a processor, cause the processor to perform a method comprising:
receiving a request to execute a workflow from a portal, at a computer implementing a workflow execution framework that is a common interface for workflow execution requests from a plurality of portals that includes the portal,
the workflow executing framework implemented as a software layer between the plurality of portals and a workflow engine, and by the workflow execution framework responsive to the request;
querying the workflow engine regarding an input parameter of the workflow;
generating a graphical user interface from which a value of the input parameter is requested,
transmitting the graphical user interface to the portal for display and receipt of the value of the input parameter at the portal;
receiving the value of the input parameter from the portal, wherein the value of the input parameter is validated by the workflow execution framework; and
sending a workflow invocation request including the value of the input parameter validated by the workflow execution framework to the workflow engine for execution of workflow by the workflow engine.

8. The computer-readable media of claim 7, wherein the method further comprises:
returning a response from the workflow engine to the portal.

9. The computer-readable media of claim 7, further comprising:
selecting, from the portal, the workflow to execute; and
sending a request, from the portal, to the user interface generator to generate the graphical user interface.

10. The computer-readable media of claim 7, further comprising:
generating a graphical user interface with an error displayed thereupon, responsive to an invalid value of the input parameter; and
transmitting the graphical user interface with the error displayed to the portal.

11. The computer-readable media of claim 7, further comprising:
auditing the workflow.

12. A computer implemented system for executing workflows, the system comprising:
at least one processor; and
at least one memory storing computer program code, wherein the at least one memory and stored computer program code are configured, with the at least one processor, to cause the system to at least:
receive a request to execute a workflow from a portal, at a computer implementing a workflow execution framework that is a common interface for workflow execution requests from a plurality of portals that includes the portal,
the workflow execution framework implemented as a software layer between the plurality of portals and a workflow engine, and by the workflow execution framework responsive to the request,
query the workflow engine regarding an input parameter of the workflow;
generate a graphical user interface from which a value of the input parameter is requested;
transmit the graphical user interface to the portal for display and receipt of the value of the input parameter at the portal;
receive the value of the input parameter from the portal, wherein the value of the input parameter is validated by the workflow execution framework; and
send a workflow invocation request including the value of the input parameter validated by the workflow execution framework to the workflow engine for execution of the workflow by the workflow engine.

13. The computer implemented system of claim 12, wherein the at least one memory and stored computer program code are further configured, with the at least one processor, to cause the system to at least:
return a response from the workflow engine to the portal.

14. The computer implemented system of claim 12, wherein the at least one memory and stored computer program code are further configured, with the at least one processor, to cause the system to at least:
select, from the portal, the workflow to execute; and
send a request, from the portal, to the user interface generator to generate the graphical user interface.

15. The computer implemented system of claim 12, wherein the at least one memory and stored computer program code are further configured, with the at least one processor, to cause the system to at least:
  generate a graphical user interface with an error displayed thereupon, responsive to an invalid value of the input parameter; and
  transmit the graphical user interface with the error displayed to the portal.

16. The computer implemented system of claim 12, wherein the at least one memory and stored computer program code are further configured, with the at least one processor, to cause the system to at least:
  audit the workflow.

17. The computer implemented system of claim 12, wherein the at least one memory and stored computer program code are further configured, with the at least one processor, to cause the system to at least:
  trace the workflow.

\* \* \* \* \*

UNITED STATES PATENT AND TRADEMARK OFFICE
CERTIFICATE OF CORRECTION

| | | |
|---|---|---|
| PATENT NO. | : 11,422,680 B1 | |
| APPLICATION NO. | : 14/285525 | |
| DATED | : August 23, 2022 | |
| INVENTOR(S) | : Akshaya Mahapatra et al. | |

It is certified that error appears in the above-identified patent and that said Letters Patent is hereby corrected as shown below:

In the Claims

In Column 9, Claim 7, Line 54, "workflow executing framework" should read -- workflow execution framework --

Signed and Sealed this
Eighth Day of November, 2022

Katherine Kelly Vidal
*Director of the United States Patent and Trademark Office*